United States Patent
Neumann

(10) Patent No.: US 9,376,003 B2
(45) Date of Patent: Jun. 28, 2016

(54) WIND STOP DEVICE

(71) Applicant: Scambia Holdings Cyprus Limited, Limassol (CY)

(72) Inventor: Peter Neumann, Oberstenfeld (DE)

(73) Assignee: Scambia Holdings Cyprus Limited, Limassol (CY)

( * ) Notice: Subject to any disclaimer, the term of this patent is extended or adjusted under 35 U.S.C. 154(b) by 0 days.

(21) Appl. No.: 14/607,653

(22) Filed: Jan. 28, 2015

(65) Prior Publication Data

US 2015/0210148 A1 Jul. 30, 2015

(30) Foreign Application Priority Data

Jan. 28, 2014 (DE) .......................... 10 2014 100 978

(51) Int. Cl.
*B60J 7/22* (2006.01)

(52) U.S. Cl.
CPC ...................... *B60J 7/223* (2013.01)

(58) Field of Classification Search
CPC .......... B60J 7/223; B60J 11/02; B60J 1/2088; B60J 5/101; B60J 7/226; B62D 35/001; B62D 35/00; B62D 35/02; B62D 35/005; B62D 35/007; B62D 37/02; B62D 35/004
USPC ............... 298/180.1, 180.5, 85, 136
See application file for complete search history.

(56) References Cited

U.S. PATENT DOCUMENTS

| 5,086,540 | A | 2/1992 | Schumacher | |
|---|---|---|---|---|
| 5,810,424 | A * | 9/1998 | Kuttner | B60J 7/223 296/180.1 |
| 6,692,063 | B2 * | 2/2004 | Dreher | B60J 7/223 296/180.1 |
| 6,926,062 | B2 * | 8/2005 | Neumann | B60J 7/223 160/370.21 |
| 7,367,608 | B2 * | 5/2008 | Rimmelspacher | B60J 7/223 296/180.1 |
| 7,699,381 | B2 * | 4/2010 | Goetz | B60J 7/223 296/180.1 |
| 7,766,415 | B2 * | 8/2010 | Riehle | B60J 7/223 136/206 |
| 2002/0105208 | A1 | 8/2002 | Dreher et al. | |
| 2007/0040413 | A1 | 2/2007 | Rimmelspacher et al. | |

FOREIGN PATENT DOCUMENTS

| DE | 39 22 580 C1 | 12/1990 |
|---|---|---|
| DE | 100 61 562 A1 | 6/2002 |
| DE | 10 2004 037 482 A1 | 2/2006 |
| DE | 10 2013 101 042 A1 | 8/2013 |
| EP | 1621386 A2 | 7/2005 |
| EP | 2623348 A1 | 2/2013 |
| WO | WO 2012/163601 A1 | 12/2012 |

\* cited by examiner

*Primary Examiner* — Glenn Dayoan
*Assistant Examiner* — Sunsurraye Westbrook
(74) *Attorney, Agent, or Firm* — Reinhart Boerner Van Deuren P.C.

(57) ABSTRACT

A wind stop device for motor vehicles having improved stability. The wind stop device comprising a wind blocker having a wind blocker frame extending transversely to a vehicles longitudinal axis. The device further comprising a flow-hindering element closing a frame opening of the wind blocker frame, wherein the wind blocker is foldable about a wind blocker-folding axis by way of at least one hinge. The device further comprising a cover pivotally connected to the wind blocker about a pivot axis and having a cover frame extending transversely to a vehicles longitudinal axis and extending away from the pivot axis. The flow-hindering element closing a frame opening of the cover frame, wherein the cover frame is foldable about a cover folding axis by way of at least one hinge, where the hinges can have a blocking device to prevent the cover frame from folding.

32 Claims, 14 Drawing Sheets

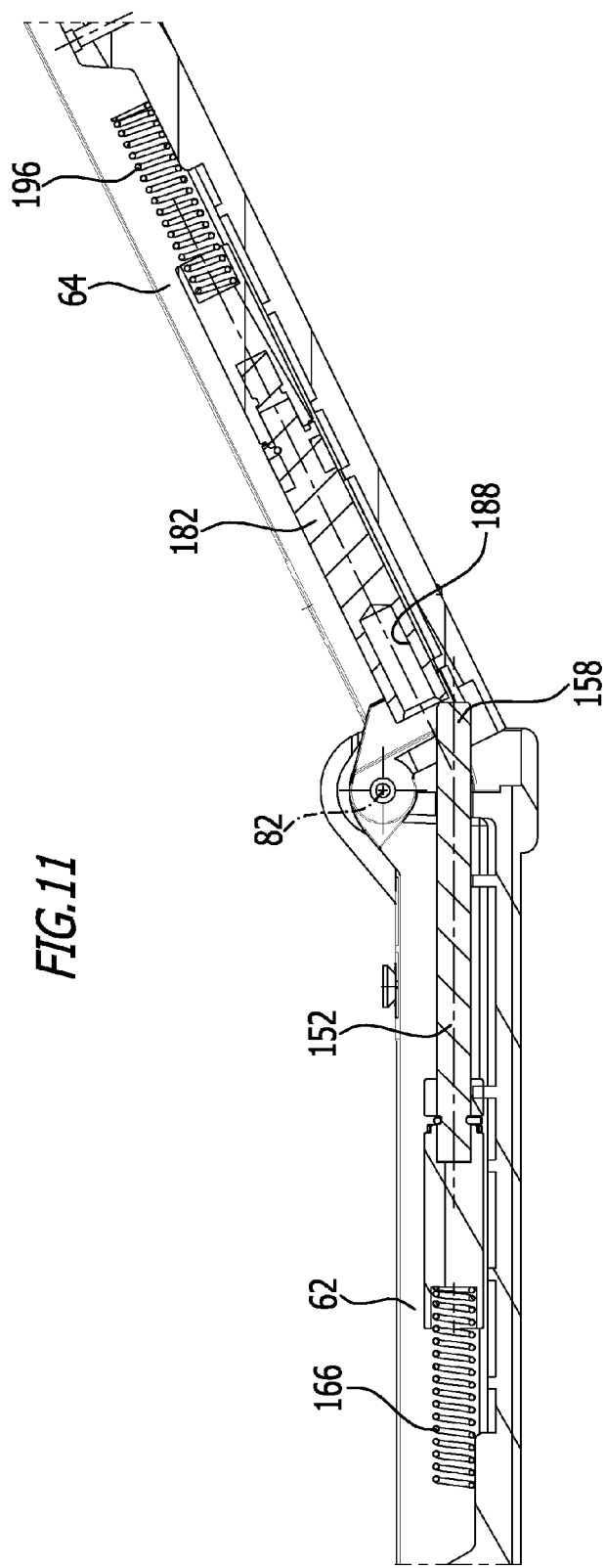

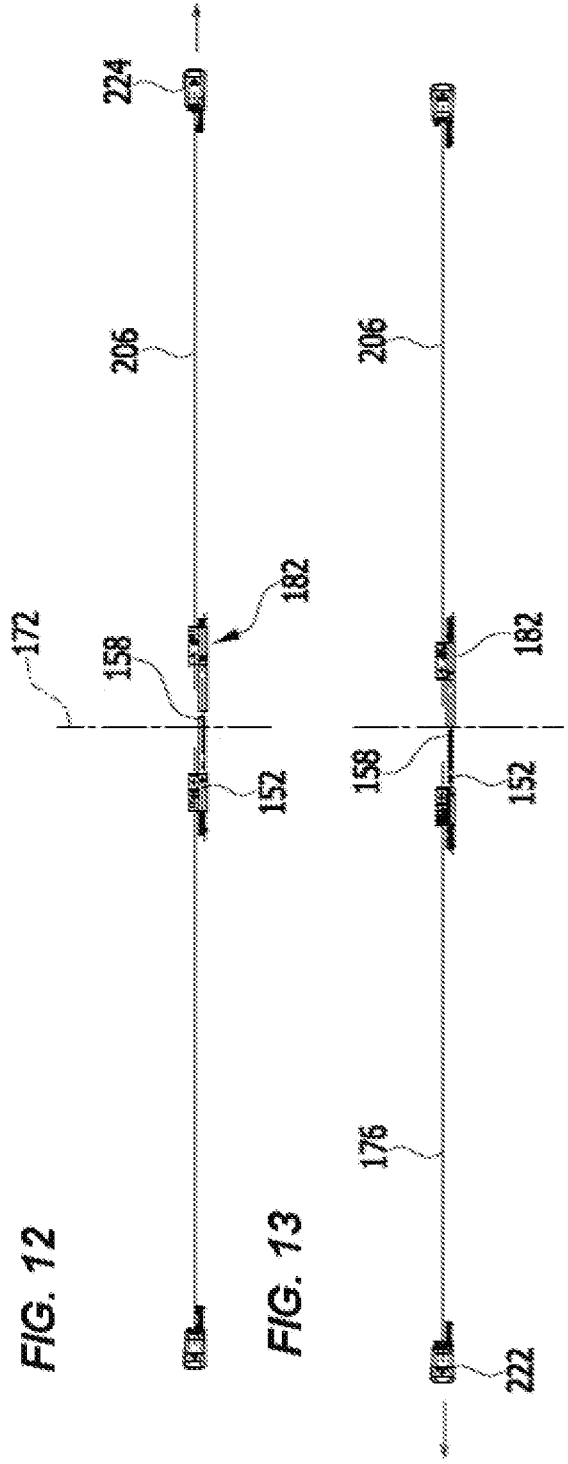

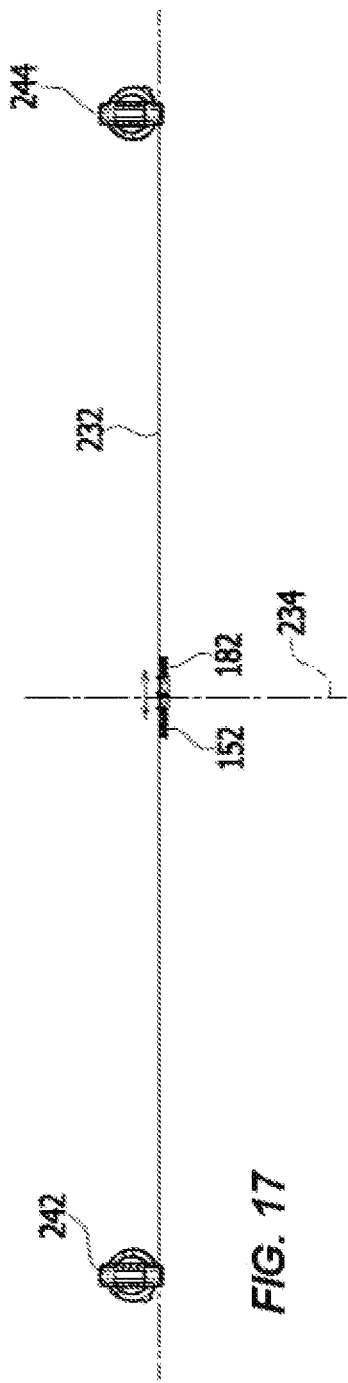
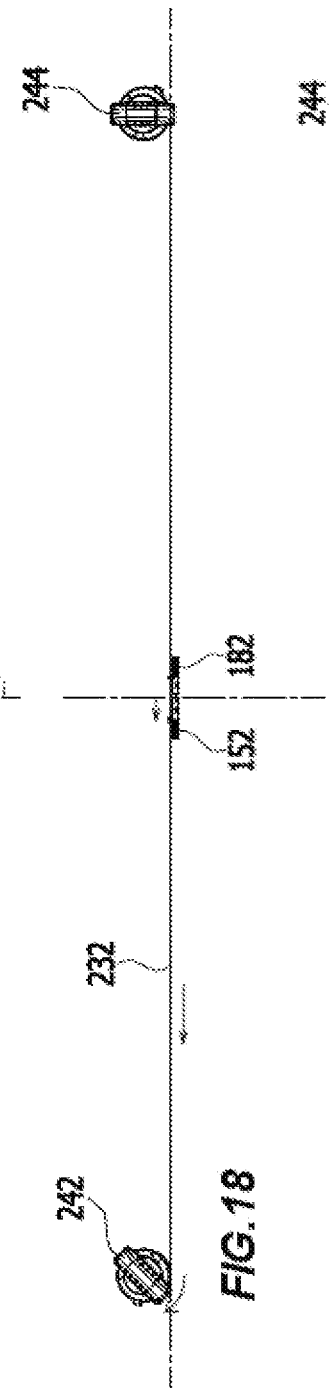
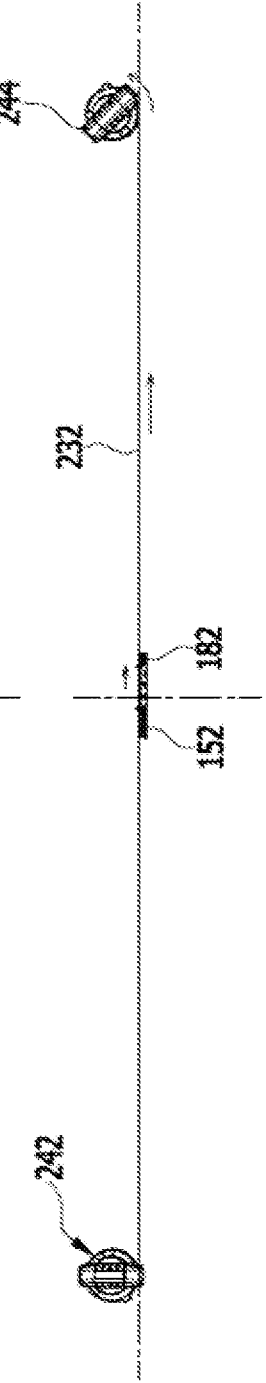
FIG. 16
FIG. 17
FIG. 18

WIND STOP DEVICE

CROSS-REFERENCE TO RELATED PATENT APPLICATION

This patent application claims the benefit of German application number 10 2014 100 978.9 of Jan. 28, 2014, the teachings and disclosure of which are hereby incorporated in their entirety by reference thereto.

BACKGROUND OF THE INVENTION

The invention relates to a wind stop device for motor vehicles, in particular convertible automobiles, comprising a wind blocker having a wind blocker frame extending in a vehicle transverse direction and a flow-hindering element closing a frame opening of the wind blocker frame, wherein the wind blocker is capable of being folded about a wind blocker folding axis between an unfolded position and a folded-together position by way of at least one hinge, a cover pivotally connected to the wind blocker about a pivot axis and having a cover frame extending in the vehicle transverse direction and extending away from the pivot axis and having a flow-hindering element closing a frame opening of the cover frame, wherein the cover frame is capable of being folded about a cover folding axis between an unfolded position and a folded-together position by way of at least one hinge.

Wind stop devices of this type are known from the prior art.

However, with these wind stop devices the problem exists that the stability of the wind stop device is not optimum.

Hence, the object underlying the invention is to increase the stability in such a wind stop device.

SUMMARY OF THE INVENTION

In accordance with the invention, this object is achieved in a wind stop device of the type described at the outset by at least one of the hinges in the unfolded position being capable of being blocked against folding into the folded-together position by way of a blocking device.

Therefore, the advantage of the solution in accordance with the invention is that it can increase the stability, and in particular also the crash safety, in such a wind stop device.

Preferably, the hinge that is capable of being blocked by the blocking device is configured such that it allows only the unfolded position and the folded-together position as well as folding movement between these positions and that it is blocked against movement beyond that, for example by corresponding stop bodies, so that, the blocking device need only block the folding movement in a direction towards the folded-together position starting from the unfolded position.

In order to prevent the blocking of the hinge from being released through a person's error or as a result of force peaks, a particularly advantageous embodiment of the blocking device constructed in accordance with the invention provides for the blocking device to be configured such that the blocking of the respective hinge is capable of being released only by actively actuating an actuating element, wherein the actuating element is arranged at the respective wind blocker frame or cover frame.

An advantageous embodiment of the blocking device constructed in accordance with the invention provides for the blocking device to comprise a first blocking element arranged on one side of the respective pivot axis and a second blocking element arranged on the opposite side of the respective pivot axis and for the blocking elements, when in the blocking position thereof, to engage in form-locking relationship.

Preferably, the blocking device is configured such that at least one of the blocking elements is capable of being moved from a blocking position to a release position.

Alternatively, the blocking device is configured such that each of the blocking elements is capable of being moved from a blocking position to a release position.

It is particularly advantageous for the blocking of the respective hinge to be already released when one of the blocking elements is in the release position.

This solution is greatly advantageous in that it simplifies the actuation of the blocking device for releasing the blocking because it is sufficient for one of the blocking elements to be moved from the blocking position to the release position, rather than necessarily having to move both actuating elements to the release position.

To this end, it is advantageous for each of the blocking elements to be mounted in a blocking element receptacle for movement between the blocking position and the release position.

By way of example, this movable mounting could be a pivotable mounting.

However, a solution that is particularly simple to integrate in a wind blocker frame or in a cover frame provides for the at least one of the blocking elements to be capable of being displaced between the blocking position and the release position without effecting a pivotal movement.

In order to define the blocking position unambiguously, provision is preferably made for the at least one of the blocking elements to have the blocking position thereof predetermined by a stop of the blocking element receptacle.

In connection with the previous description of the individual exemplary embodiments, no details have been given as to how the blocking elements themselves are to be configured.

An advantageous embodiment provides that each of the blocking elements comprises a form-locking element configured complementarily to the other form-locking element and that in the blocking position of both blocking elements the form-locking elements engage with each other.

Complementary form-locking elements are to be taken to mean form-locking elements that are shaped such that one of the form-locking elements can have a portion thereof come into form-locking engagement with a portion of the other form-locking element conforming to the shape of the first-named portion or such that each of the form-locking elements comprises one portion that is capable of coming into operative connection with another portion of the other form-locking element correspondingly conforming to the shape of the first-named portion.

In particular, provision is made for the form-locking elements to be configured such that when one of the form-locking elements is in the release position, the form-locking elements are out of engagement and blocking of the respective hinge is released.

In a particularly advantageous solution it is provided for at least one of the form-locking elements to be configured as a projection which in the blocking position of both form-locking elements engages in the other form-locking element, which is configured as a projection receptacle.

In this case it is advantageously provided for the blocking element comprising the projection receptacle to be capable of engaging behind the projection in a plane of motion perpendicular to the respective pivot axis, on the side that allows the blocking of a folding action from the unfolded position to the folded-together position.

It is in particular provided that in the transfer of the respective frame from the folded-together position to the unfolded position, the blocking elements, when in the unfolded position, are in their blocking position and block the respective hinge.

For the at least one blocking element to move of its own accord into the blocking position thereof, it is preferably provided for the at least one of the blocking elements to be biased in a direction towards the blocking position thereof by way of a spring force reservoir.

In the case of two movable blocking elements, each of the blocking elements is biased in a direction towards the blocking position thereof by way of a spring force reservoir.

In principle, it would be conceivable for the blocking element receptacles to be arranged such that they are outside the bars forming the wind blocker frame or the cover frame.

A particularly advantageous solution provides for the blocking element receptacles to be held at ends of bars of the wind blocker frame or cover frame that adjoin the respective hinge.

It is particularly advantageous for the blocking element receptacles to be integrated in the ends of the bars that adjoin the hinge.

Furthermore, no details have been provided with respect to the movement of the blocking elements from the blocking position to the release position.

Thus, an advantageous solution provides for the blocking elements to be capable of being moved from the blocking position to the release position by way of an actuating element.

For example, provision is made for the actuating elements to be arranged at the respective frame, i.e. at the respective wind blocker frame or cover frame.

In particular, the actuating elements are arranged such that they are located in lateral outer regions of the wind blocker frame or of the cover frame and therefore near a side wall of the car body so that they are easily accessed by a person standing by the side of the car body.

Preferably, the coupling between the respective actuating element and the respective blocking element is realized by a pull element which connects the actuating element to the blocking element.

In particular, provision is made for the pull element to extend from the respective blocking element to the actuating element in the respective frame.

One solution provides for each of the blocking elements to be coupled to the corresponding actuating element via a pull element.

Another advantageous solution provides for a single pull element to extend from one actuating element to the other actuating element, transversely to the respective hinge axis, across the respective hinge, and for the pull element to comprise at least one pull body which, when actuating only one of the actuating elements and moving the pull element, moves one of the blocking elements from the blocking position to the release position.

An advantageous embodiment of the wind stop device provides for the wind blocker frame and the cover frame to be pivotable relative to each other about the pivot axis such that in a flipped-down position of the wind blocker frame, the one of the frames lies in the frame opening of the other one of the frames.

The advantage of this solution is that a space-saving arrangement of the wind blocker frame relative to the cover frame already exists when the wind blocker frame is in its flipped-down position so that upon subsequent folding of the wind blocker frame and the cover frame, the space requirement is also small for the folded-together wind stop device.

It is particularly advantageous if, in the flipped-down position of the wind blocker frame, an overall height of the wind stop device corresponds to the frame width of the frame having the largest frame width.

It is particularly advantageous for the frame width of the wind blocker frame and of the cover frame to be made approximately the same size.

In connection with the solutions described thus far, it has been assumed that the wind blocker frame is capable of being folded about the wind blocker folding axis and the cover frame is capable of being folded about the cover folding axis, wherein the direction of folding has been left open.

In principle, it is conceivable for the wind blocker frame and the cover frame to be folded in different folding directions.

A wind stop device constructed in accordance with the invention that has a particularly small installation space requirement is obtained if, starting from the flipped-down position of the wind blocker frame, the wind blocker frame and the cover frame are capable of being folded in the same folding direction so that the folded-together wind stop device then has an overall height which can correspond for example to twice the overall height thereof in the flipped-down position of the wind blocker frame.

The folding of the wind blocker frame and the cover frame can be carried out optimally in particular if the wind blocker folding axis and the cover folding axis in the flipped-down position of the wind blocker frame are arranged substantially coincident with each other so that both the wind blocker frame and the cover frame can in fact be folded about substantially the same folding axis.

No details have been provided yet as to the relative location of the wind blocker frame and the cover frame when the wind blocker frame is in the flipped-down position.

Thus, for the folding of the wind stop device, it is particularly advantageous if, in the flipped-down position of the wind blocker frame, a mid-plane of the one of the frames lies approximately parallel to the mid-plane of the other one of the frames.

It is particularly advantageous if, in the flipped-down position of the wind blocker frame, the mid-planes of the wind blocker frame and of the cover frame are arranged in approximately coincident relation.

It is particularly advantageous for the folding of the wind blocker if the wind blocker folding axis lies in a plane that does not intersect ends of the cross bars of the wind blocker frame that adjoin the wind blocker folding axis.

Furthermore, it is advantageous for the folding of the cover frame if the cover folding axis lies in a plane that does not intersect ends of the cross bars of the cover frame that adjoin the cover folding axis.

In both cases, it is thereby possible for the ends of the bars that adjoin the wind blocker folding axis and the cover folding axis in each case to be arranged such that they lie on top of each other or at a small distance from each other when in the folded position, and it is thereby possible to fold both the wind blocker frame and the cover frame by substantially 180°.

No details have been provided yet as to the extension of the flow-hindering element relative to the wind blocker frame. Thus, an advantageous solution provides that in the flipped-down position of the wind blocker frame, the flow-hindering element of the wind blocker extends in a surface which is tangent to the wind blocker frame on a side thereof.

Furthermore, with regard to the relative arrangement of the flow-hindering element and the wind blocker folding axis, an advantageous embodiment provides that in the flipped-down position of the wind blocker frame, the wind blocker folding axis extends substantially in the surface in which the flow-hindering element of the wind blocker extends.

Furthermore, no details have been provided as to the relative arrangement of the flow-hindering element of the cover relative to the cover frame. An advantageous solution provides that in the flipped-down position of the wind blocker frame, the flow-hindering element of the cover extends in a surface which is tangent to the cover frame on a side thereof.

Furthermore, an advantageous relative arrangement of the cover folding axis and the flow-hindering element provides that in the flipped-down position of the wind blocker frame, the cover folding axis extends substantially in a surface in which the flow-hindering element of the cover extends.

In the wind stop device constructed in accordance with the invention, folding about the wind blocker folding axis and the cover folding axis can be particularly advantageously carried out if, in the flipped-down position of the wind blocker frame, the flow-hindering element of the wind blocker and the flow-hindering element of the cover are in substantially contacting relationship against each other.

In the context of the previous description of the individual exemplary embodiments, no details have been given as to the configuration of the wind blocker frame.

Thus, an advantageous solution provides for the wind blocker frame to be configured as one that encloses a frame opening in an approximately U-shaped formation.

An alternative solution provides for the wind blocker frame to be configured as one that extends all around a frame opening in a closed path.

With regard to the configuration of the cover frame, it is preferably provided for the cover frame to be configured as one that encloses a frame opening in an approximately U-shaped formation.

The relative arrangement of the flow-hindering elements of the wind blocker and the cover may be embodied in a variety of ways.

A simple embodiment provides for the flow-hindering element of the cover to be configured and arranged separately from the flow-hindering element of the wind blocker.

However, an advantageous solution provides for the flow-hindering element of the wind blocker to transition into the flow-hindering element of the cover.

In the case of a wind blocker frame that extends all around the frame opening in a closed path, the flow-hindering element is fixed to the lower bars.

A further advantageous embodiment provides for the flow-hindering element of the wind blocker and the flow-hindering element of the cover to transition into each other directly in a transition region between upper cross bars of the wind blocker frame and rear cross bars of the cover frame.

In the solution in accordance with the invention, it is particularly advantageous for the respective flow-hindering element to be formed from an elastic material.

In the context of the wind stop device constructed in accordance with the invention, no details have been given so far as to the positioning of the wind blocker relative to the cover.

In this respect, an advantageous solution of the wind stop device provides for the wind blocker to be capable of being stably positioned in a flipped-up active position and in a flipped-down inactive position by way of a positioning device.

Further features and advantages of the invention are the subject of the following description and drawings of a number of exemplary embodiments.

BRIEF DESCRIPTION OF THE DRAWINGS

FIG. 11 is a section similar to FIG. 10, showing the hinge in an even straighter configuration relative to FIG. 10;

FIG. 12 is a schematic representation of the blocking device in a non-actuated state in accordance with the first exemplary embodiment.

FIG. 13 is a schematic representation of the blocking device in FIG. 12 showing the actuation element actuated in accordance with the first exemplary embodiment;

FIG. 14 is a schematic representation of the blocking device in FIG. 12 with the actuating element actuated and showing the pull effect exerted on the pull element which displaces the second blocking element away from the first blocking element in accordance with the first exemplary embodiment;

FIG. 16 is a schematic representation the blocking device showing the pull element in its non-actuated position in accordance with the second exemplary embodiment;

FIG. 17 is a schematic representation of the blocking device of FIG. 16 showing the actuating element actuated in accordance with the second exemplary embodiment; and FIG. 18 is a schematic representation of the blocking device of FIG. 16 showing the actuating element actuated, with the pull element moving the pull body and the pull body acting on the arm to move the driver element together with the second blocking element in accordance with the second exemplary embodiment.

DETAILED DESCRIPTION OF THE INVENTION

Figure 1:
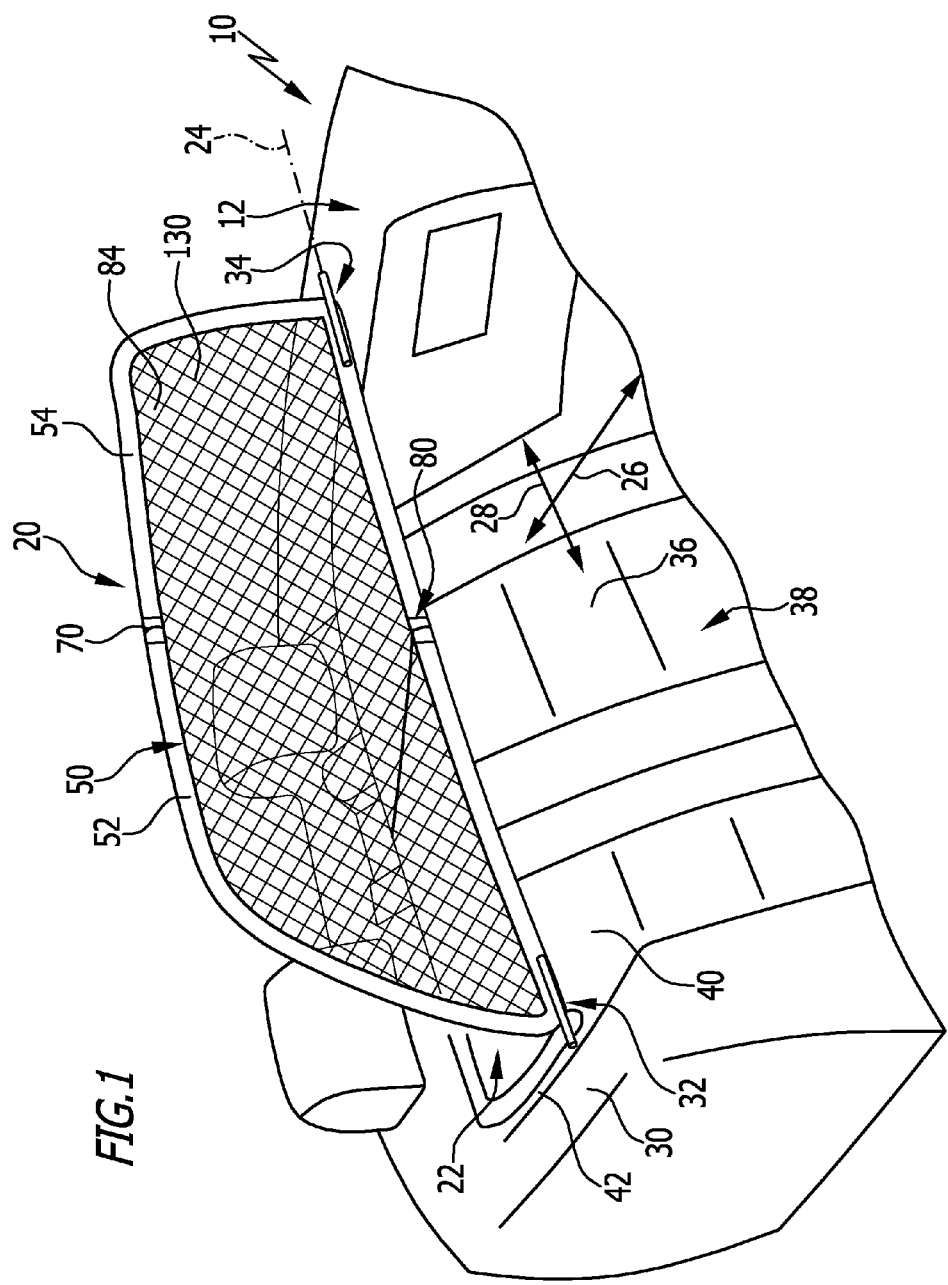
FIG. 1 is a perspective view of a first exemplary embodiment of a wind stop device constructed in accordance with the invention, shown mounted to a partly shown car body.

A first exemplary embodiment of a wind stop device 10 constructed in accordance with the invention and designed for use in a convertible car and illustrated in FIG. 1 in a condition when mounted to a car body 12 comprises a wind blocker 20 and a cover 22, these being pivotally interconnected about a pivot axis 24, the pivot axis 24 being oriented parallel to a vehicle transverse axis 28 extending transversely to the vehicle longitudinal axis 26.

In the condition when mounted to the car body 12, the cover 22 is in contact against the car body 12 at the height of a belt line 30 of the car body 12 and is connected to the car body 12 via fixing devices 32 and 34, wherein the cover 22 covers a rear area 36 of a passenger compartment that is for example bounded by and located forwardly of a rear seat set 38 of the car body 12.

Preferably, the cover 22 adjoins rear seat backrests 40 of the rear seat set 38 or even covers these so that the cover 22 substantially closes a rear area 42 of a body opening of the convertible car located substantially at the level of the belt line 30.

The pivot axis 24 is arranged on a side of the cover 22 that faces towards a front seat row, not shown in the drawing, so that the wind blocker 20 in its flipped-up active position is essentially behind backrests and headrests of a front seat row.

Figure 2:
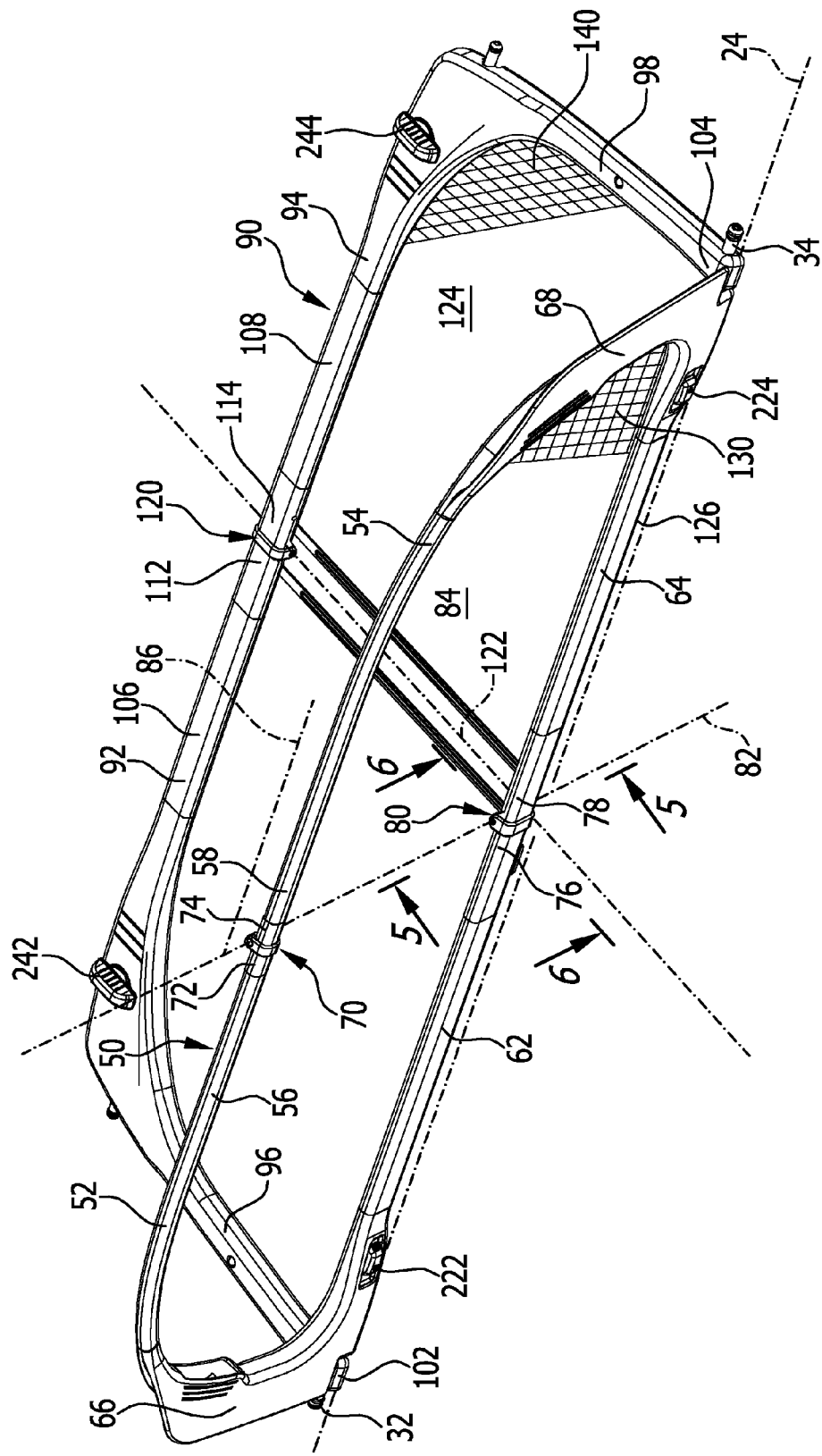
FIG. 2 is a perspective view, drawn to a larger scale, of the first exemplary embodiment of the wind stop device constructed in accordance with the invention, shown with the wind blocker flipped up to an active position.

As shown in FIG. 1 and, drawn to a larger scale, in FIG. 2, the wind blocker 20 comprises a wind blocker frame 50 formed from two frame halves 52 and 54, each of which is shaped in an approximately C-form configuration and each of which comprises an upper cross bar 56 and 58 as well as a lower cross bar 62 and 64 which are connected together by lateral bars 66 and 68. The upper cross bars 56 and 58 are, in the area of their free ends 72 and 74 facing away from the lateral cross bars 66 and 68, connected together by way of a hinge 70, and the lower cross bars 62 and 64 are, in the area of their free ends 76 and 78 facing away from the lateral bars 66 and 68, connected together by way of a hinge 80, wherein the two hinges 70 and 80 define a wind blocker folding axis 82 along which the frame halves 52 and 54 are capable of being folded together from an extended position shown in FIGS. 1 to 3 to a folded position, as will be described in more detail below.

When the wind blocker frame 50 is in the non-folded position, it encloses a frame opening 84.

Figure 3:
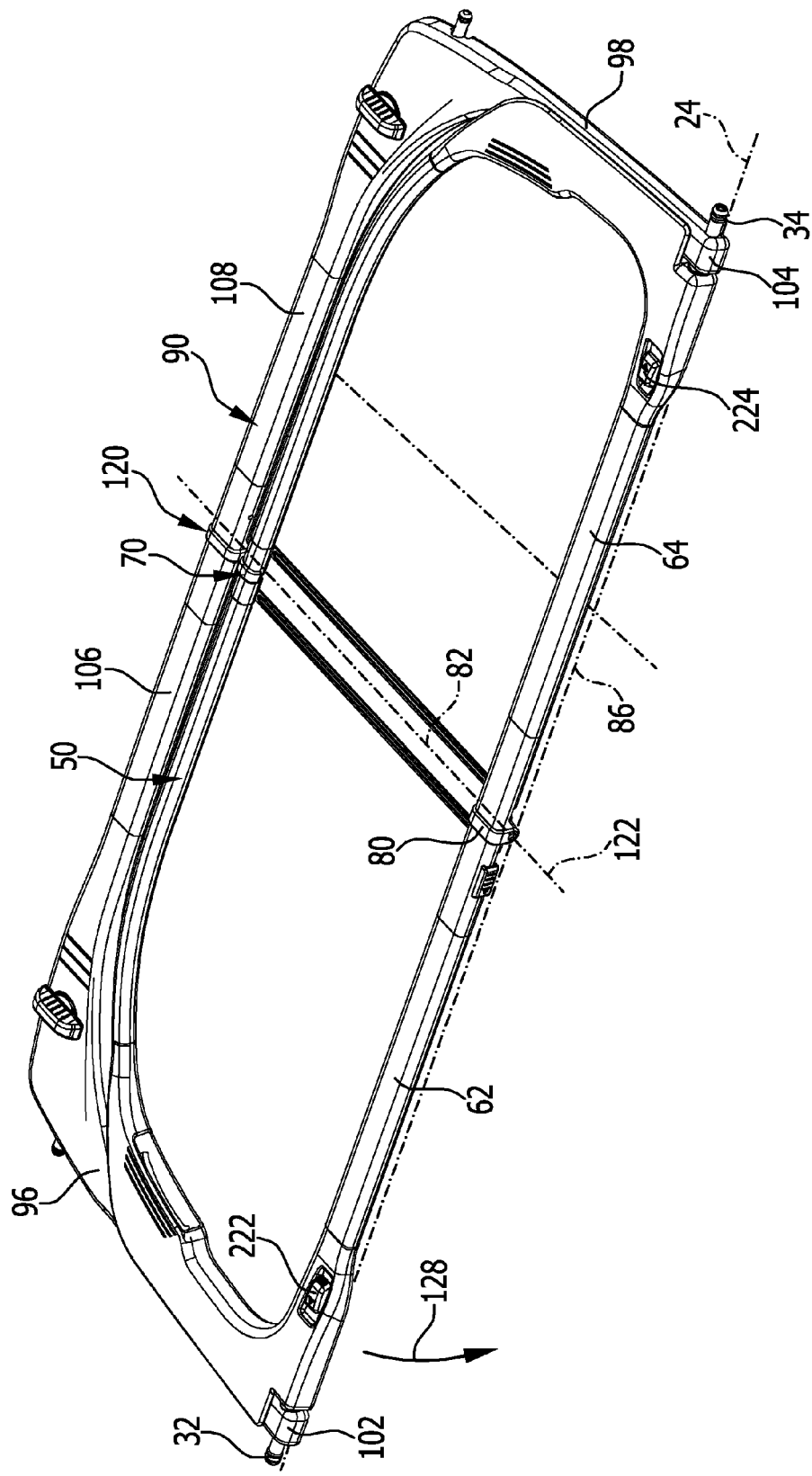
FIG. 3 is a view similar to FIG. 2, but representing the wind blocker as flipped down to an inactive position.

Furthermore, the cover 22 comprises a substantially C-shaped cover frame 90 formed from two frame elements 92 and 94, each of which comprises a lateral bar 96 and 98, each of which extends from a bearing body 102 and 104 designed for the pivotal mounting of the wind blocker 20 about the axis 24 to a rear cross bar 106 and 108 which are connected at ends 112 and 114 facing towards each other by way of a hinge 120 which defines a cover folding axis 122 about which the frame elements 92 and 94 of the cover frame 90 are capable of being brought from the extended position illustrated in FIGS. 1 to 3 to a folded position, as will be described in more detail below.

In the wind stop device 10 constructed in accordance with the invention, the wind blocker 20 is capable of being pivoted about the pivot axis 24 from a flipped up active position depicted in FIGS. 1 and 2 to an inactive, or flipped-down, position illustrated in FIG. 3 wherein, as shown in FIG. 3, the wind blocker frame 50 is configured such that it is, at a lower area thereof comprising the lower cross bars 62, 64, arranged between the bearing bodies 102 and 104 and, therefore, the entire wind blocker frame 50 in the flipped-down and inactive position shown in FIG. 3 lies with its lateral bars 66 and 68 and its upper cross bars 56 and 58 between the lateral bars 96 and 98 and the rear cross bars 106 and 108 of the cover frame 90.

Thus, the wind blocker frame 50 lies substantially within a frame opening 124 that is bounded by the cover frame 90 with the lateral bars 96 and 98 and the rear cross bars 106 and 108 thereof and extends as far as the pivot axis 24.

Figure 4:
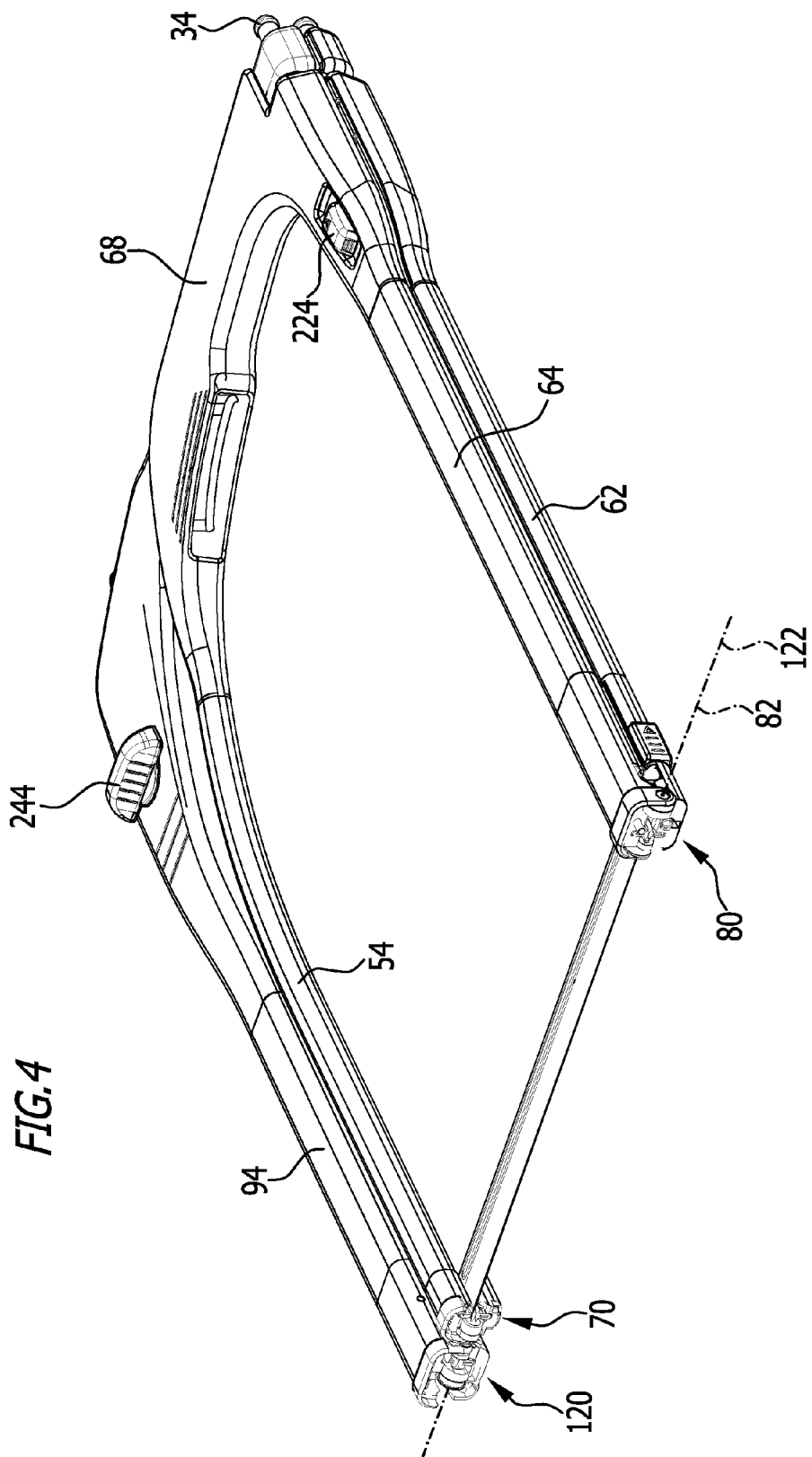
FIG. 4 is a perspective view of the first exemplary embodiment of the wind stop device constructed in accordance with the invention, showing the wind blocker and the cover in folded position.

Preferably, the hinges 70 and 80 as well as the hinge 120 are arranged such that in the flipped-down position of the wind blocker frame 50 shown in FIG. 3, the wind blocker folding axis 82 and the cover folding axis 122 are substantially coincident with each other so that equidirectional folding is possible, i.e. folding both the wind blocker 20 and the cover 22 about the common wind blocker folding axis 82 and cover folding axis 122 in a folding direction 128 to achieve the folded position shown in FIG. 4 in which the bearing body 102 is under the bearing body 104, the lower cross bar 62 is under the lower cross bar 64, the upper cross bar 56 is under the upper cross bar 58 and the rear cross bar 106 is under the rear cross bar 108.

That is, when folded about the wind blocker folding axis 82 and the cover folding axis 122 coincident with each other, the frame half 52 of the wind blocker frame is on one side of the frame half 54 and the frame element 92 of the cover frame 90 is on the same side of the frame element 94 of the cover frame 90.

With symmetrical configuration of the frame halves 52 and 54 relative to the wind blocker folding axis 82 and of the frame elements 92 and 94 relative to the cover folding axis 122, the lateral bars 98 and 96 as well as the lateral bars 68 and 66 lie one above the other in each case.

In this case, optimally compact folding of the wind stop device is given, in which, in the folded position, the overall height is twice the overall height B of the wind stop device 10 when the wind blocker frame 50 is in the flipped-down position.

The prerequisite to obtaining such an optimally compact folding is that the wind blocker folding axis 82, as shown for example in FIG. 3, is in a plane 86 which is laterally tangent to, or touches, but does not intersect the ends 72 and 74 of the upper cross bars 56 and 58 and is laterally tangent to, or touches, but does not intersect the ends 76 and 78 of the lower cross bars 62 and 64 so that the ends 72 and 74 and the ends 76 and 78 when folded about the wind blocker folding axis 82 extend approximately parallel to each other and at a small distance from or in contact against each other.

In like manner, the cover folding axis 122 is also arranged such that it lies in a plane 126 which likewise does not intersect the ends 112 and 114 of the rear cross bars 106 and 108 but only touches them laterally so that when folding the rear cross bars 106 and 108 about the cover folding axis 122, these can also be oriented approximately parallel to each other, wherein the ends 112 and 114 touch each other or extend at a small distance from each other.

In the first exemplary embodiment of the wind stop device constructed in accordance with the invention and depicted in FIGS. 1 to 4, the frame opening 84 of the wind blocker frame 50 is closed by a flow-hindering element 130 which lies approximately in the plane 86 and therefore is in contact against and in touching relation with the wind blocker frame 50 on a side thereof facing towards the cover frame 90.

Furthermore, the cover frame 90 is also closed by way of a flow-hindering element 140 which is in contact against the cover frame 90 on a side thereof facing towards the car body 12 and which therefore, in the area of the cover folding axis 122, extends in the plane 126.

As a consequence, in the flipped-down position of the wind blocker frame 50 as represented in FIG. 3, the flow-hindering elements 130 and 140 lie essentially directly on top of each other, and due to the fact that the flow-hindering elements 130 and 140 extend in the planes 86 and 126 respectively, the wind blocker folding axis 82 and the cover folding axis 122 also lie in the surface in which the respective flow-hindering element 130 or 140 extends, so that folding of both the wind blocker frame 50 and the cover frame 90 without exerting additional pull on the flow-hindering elements 130 and 140 respectively is possible.

A first exemplary embodiment of a hinge constructed in accordance with the invention and depicted in FIGS. 5 to 11, in this case exemplified by the hinge 80, and which is in particular configured such that it only allows pivoting about the respective axis for folding the wind blocker frame 50 and/or the cover frame 90 between the unfolded position and the folded-together position, comprises a blocking device, generally designated 150, which serves to prevent pivotal movement about the wind blocker folding axis 82, in particular in a direction of folding from the unfolded position to the folded-together position.

Figure 5:
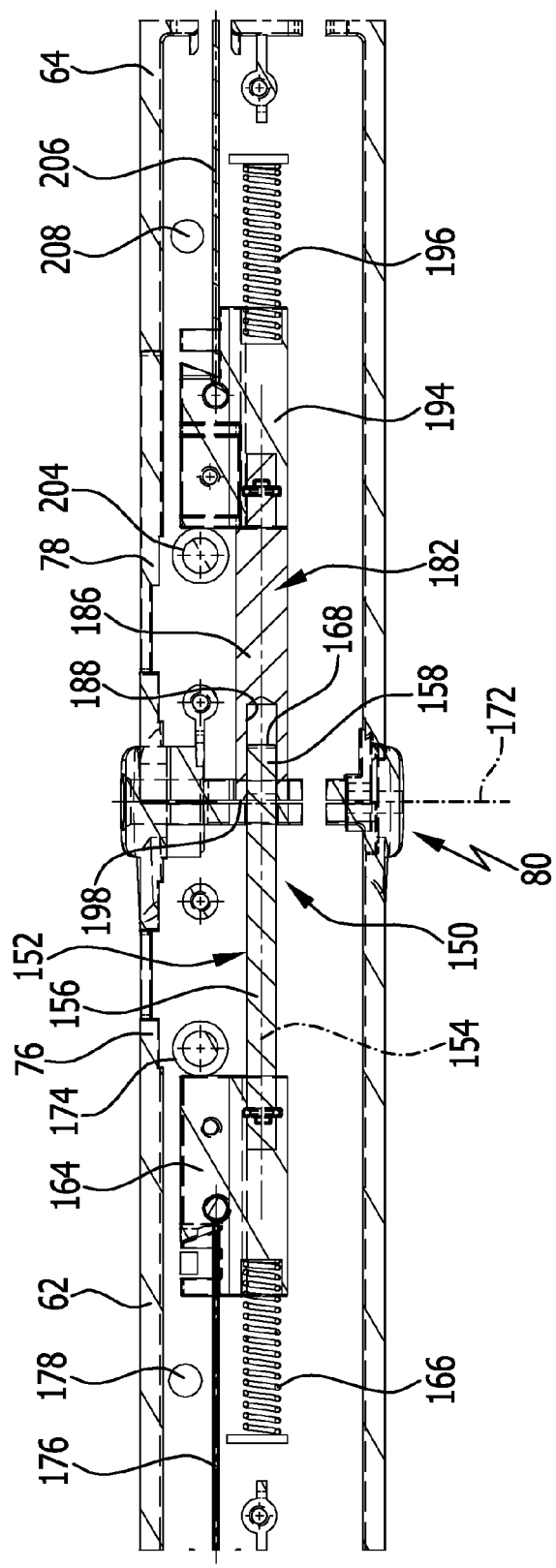
FIG. 5 is a section taken along lines 5-5 in FIG. 2 through a hinge of a wind blocker frame which uses a first exemplary embodiment of a blocking device, shown with blocking elements in their blocking positions.
Figure 6:
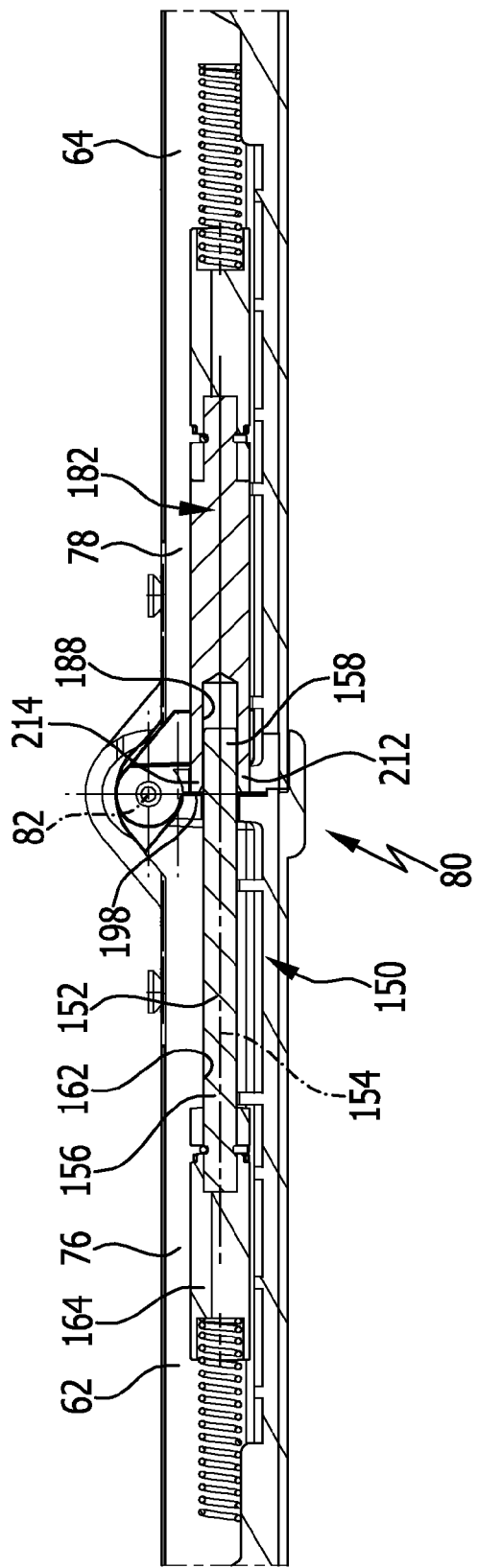
FIG. 6 is a section taken along lines 6-6 in FIG. 2 through the hinge using the first exemplary embodiment of the blocking device, shown with blocking elements in their blocking positions.

As shown in FIGS. 5 and 6, the blocking device 150 comprises a first blocking element 152 arranged in the end 76 of the cross bar 62, said first blocking element 152 being mounted for displacement in the end 76 of the cross bar 62 in parallel to a centre axis 154 of the end 76 and comprising a guide body 156 having integrally formed thereon, as a form-locking element, a projection 158 which is for example in the form of a tongue or, as in the exemplary embodiment illustrated, in the form of a cylindrical extension.

Preferably, the guide body 156 is also configured as a cylindrical pin and is guided for displacement in a blocking element receptacle 162 of the end 76 in a direction parallel to the centre axis 154, said blocking element receptacle 162 comprising a guide channel.

The guide body 156 itself is fixedly connected to a driver element 164 which fixingly receives an end of the guide body 156 opposite the projection 158.

As shown in FIG. 5 in particular, a spring force reservoir 166 acts on the driver element 164, said spring force reservoir 166 biasing the driver element 164 together with the first blocking element 152 in a direction towards the opposite end 78 so that the first blocking element 152, when in its blocking position shown in FIGS. 5 and 6 and when the hinge 80 is straight, has the first form-locking element 158, configured as a projection, passing through a parting plane 172 between the ends 76 and 78 and projecting into the end 78 of the cross bar 64 so that an end face 168 of the projection 158 is arranged in the end 78.

The blocking position of the first blocking element 152 is predetermined by a stop 174 against which the driver element 164 is in contact when in the blocking position and against which the driver element 164 is maintained in contact by the spring force reservoir 166 while in the blocking position.

Figure 7:
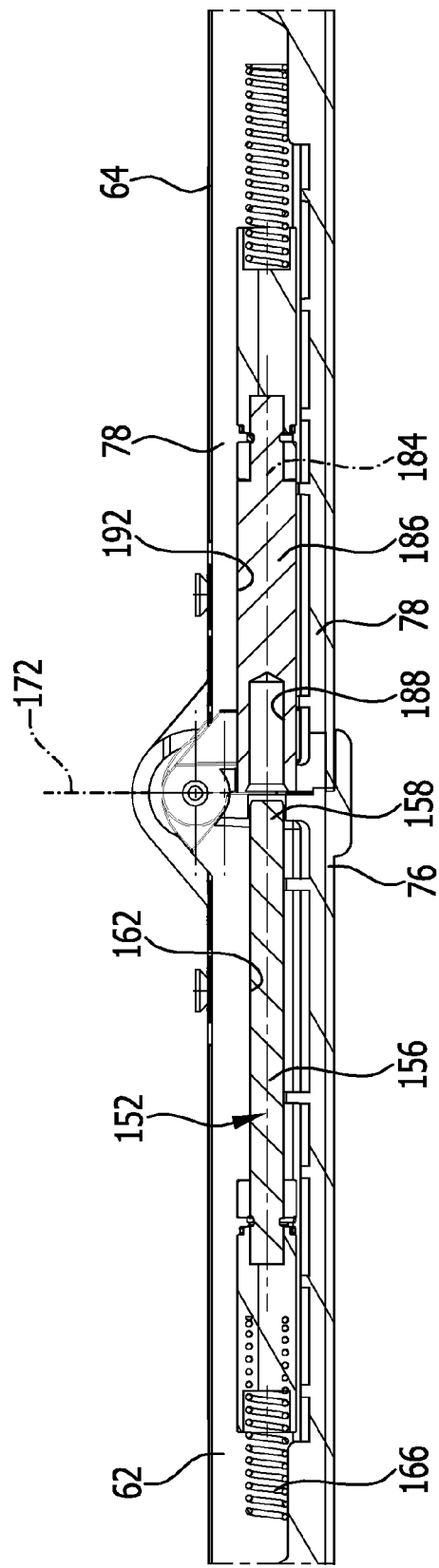
FIG. 7 is a section corresponding to FIG. 6, showing a first blocking element in release position and a second blocking element in blocking position.

For moving the first blocking element 152 out of the blocking position shown in FIGS. 5 and 6, the driver element 164 is connected to a pull element 176 which, as will be described in greater detail below, is capable of being actuated to move the first blocking element 152 to the release position thereof, in which, as illustrated in FIG. 7, the first blocking element 152 has the first form-locking element 158 no longer passing through the parting plane 172 but at most in touching relationship with the parting plane 172 or arranged at a small distance therefrom on the side of the end 76 of the cross bar 62.

The release position of the first blocking element 152 can also be defined by a stop 178 which also acts on the driver element 164 for simplicity.

Furthermore, the blocking device 150 comprises a second blocking element, generally designated by 182, which is guided for movement in the end 78 of the cross bar 64 in parallel to a centre axis 184 and comprises a guide body 186 which has provided thereon, as a form-locking element, not a projection but a recess 188 that faces towards the end 76 and, as seen in a plane extending transversely to the centre axis 184, may either be rectangular in cross-section or, where a pin-shaped projection 158 is provided, of circular cross-section.

For movable mounting of the guide body 186 in the end 78, the latter has provided therein a blocking element receptacle 192 comprising a guide channel.

Furthermore, as shown in FIG. 5 in particular, the second blocking element 182 also is, in the area of the end thereof opposite the recess 188, fixed to a driver element 194 which has a spring force reservoir 196 acting on it such that the second blocking element 182 is held in its blocking position under the influence of the spring force reservoir 196.

In the blocking position, the second blocking element 182 adjoins at its end face 198 the parting plane 172 or is arranged at a slight distance from the parting plane 172 within the end 78, but preferably does not pass through the parting plane 172.

The end 78 also has provided therein a stop 204 for defining the blocking position of the second blocking element 182.

Furthermore, the second blocking element 182 is also capable of having a pull element 206 acting upon it against the action of force of the spring force reservoir 196 so that the second blocking element 182 is capable of being moved to a release position which is also defined by a stop 208, wherein the stop 208 acts upon the driver element 194.

The release position is selected such that the end face 198 of the second blocking element, from which the recess 188 extends into the second blocking element, is capable of being moved away from the parting plane 172 far enough that the first form-locking element 158 no longer engages into the second form-locking element 188, but rather that the end face 168 of the projection 158 is outside the recess 188 forming the second form-locking element.

Figure 8:
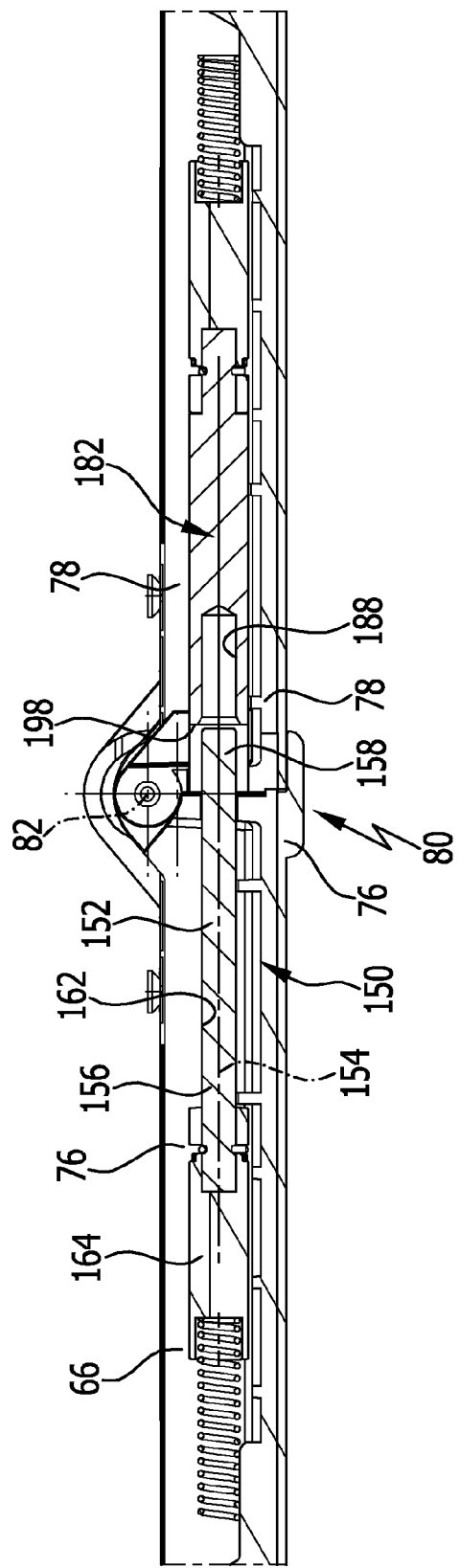
FIG. 8 is a section corresponding to FIG. 6, illustrating a second blocking element in release position and a first blocking element in blocking position.

This position of the second blocking element 182 is shown in FIG. 8 for example.

In particular, the recess 188 constructed in accordance with the invention and provided in the second blocking element 182 is configured such that it comprises, on either side of the recess 188 as seen in a plane extending perpendicularly to the wind blocker folding axis 82 and intersecting the recess 188, wall areas 212 and 214 which accommodate and fix between them the projection 158 so that when engaging into the recess 188, the projection 158 maintains the two blocking elements 152 and 182 in a defined, for example in-line, alignment relative to each other, with the consequence that the interengaged blocking elements 152 and 182 block pivotal movement of the ends 76 and 78 about the wind blocker folding axis 82 because each of the blocking elements 152 and 182 is guided in the corresponding guide channel 162 and 192 of the respective end 76, 78.

However, if one of the blocking elements 152, 182 is moved to its release position, it is thereby possible to pivot the ends 76 and 78 relative to each other relative to the wind blocker folding axis 82 and therefore, for example, to fold the wind blocker 20 about the wind blocker folding axis 82 when, for example, the wind blocker folding axis 82 is coincident with the cover folding axis 122 as described at the outset.

Once the ends 76 and 78 have been pivoted about the wind blocker folding axis 82 far enough that the projection 158 can no longer engage into the recess 188, the ends 76 and 78 can be pivoted freely until for example the folded position as depicted in FIG. 4 is achieved.

Figure 9:
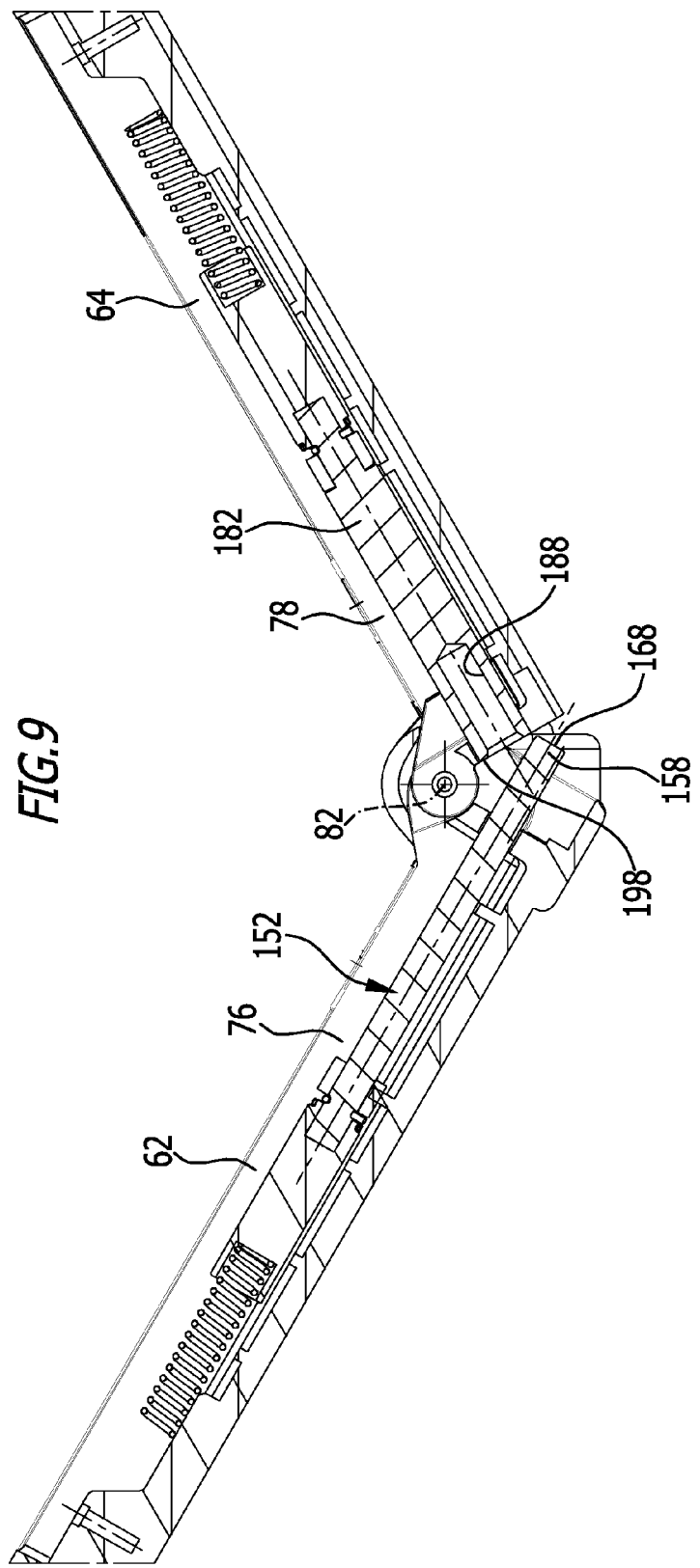
FIG. 9 is a section similar to FIG. 6, showing the hinge as bent to a position in which the blocking elements in the blocking positions thereof are in touching relation.
Figure 10:
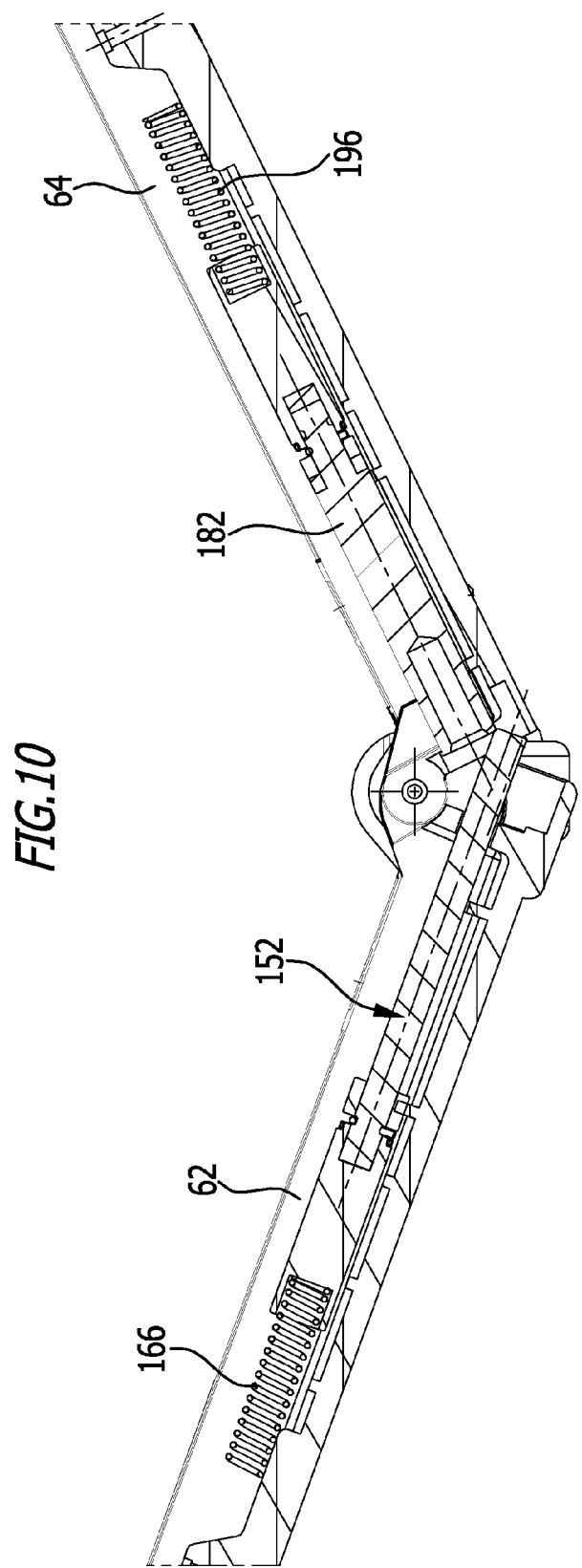
FIG. 10 is a section similar to FIG. 9 but wherein, relative to FIG. 9, the hinge is shown in a straighter condition and the second blocking element is shown as displaced from the blocking position in a direction towards its release position by the first blocking element.

When the wind blocker 20 is unfolded again by pivoting the ends 76 and 78 such that the cross bars 62 and 64 are moved towards a direction of a position in which they are aligned in line relative to each other, no actuation of the blocking elements 152 and 182 is needed, as is apparent from the sequence of the illustrations in FIGS. 9, 10 and 11.

As soon as actuation ceases, the blocking elements 152 and 182 are in their blocking positions, but without interengaging, as is depicted in FIG. 9.

When the ends 76 and 78 are increasingly pivoted about the pivot axis 82 in a direction towards a position in which the bars 66 and 68 are aligned in line relative to each other, the form-locking elements 158 and 188, namely the projection 158 and the recess 188, move towards each other, wherein first, as shown in FIG. 10, the end face 168 of the projection 158 touches the end face 198 of the second blocking element 182 at an outer area thereof.

With further pivoting, the end faces 168 and 198 act against each other and cause either the first blocking element 152 to be displaced against the force of the spring force reservoir 166 or the second blocking element 182 to be displaced against the force of the spring force reservoir 196 or both blocking elements 152 and 182 to be displaced away from each other against the force of their spring force reservoirs 166 and 196, wherein in FIG. 10 and FIG. 11 there is shown by way of example a displacement of the second blocking element 182 against the spring force reservoir 196.

This displacement continues until there is an opportunity for the projection 158 to insert into the recess 188 so that the form-locking elements 158 and 188 can resume engagement with each other and both blocking elements 152 and 182 can resume their blocking positions, in each case owing to the biasing exerted thereon by the spring force reservoirs 166 and 196.

In the first exemplary embodiment of the blocking device 150 constructed in accordance with the invention, the pull elements 176 and 206 are each coupled to actuating elements 222 and 224 respectively, these being arranged at the cross bars 62 and 64, near the bearing bodies 102 and 104.

In FIG. 12 is shown the blocking device 150 with the actuating elements 222 and 224 in a non-actuated state, and the blocking elements 152 and 182 are in engaging relationship with each other at their form-locking elements 158 and 188, wherein the projection 158 passes through the parting plane 172.

In FIG. 13 is shown what will result if the actuating element 222 is actuated.

Such actuation causes a pull effect to be exerted on the pull element 176 so that the blocking element 152 is moved in a direction parallel to the centre axis 154, away from the second blocking element 182, and therefore the projection 158 no longer engages in the receptacle 188 and the first blocking element 152 is in its release position and therefore no longer passes through the parting plane 172.

In this case, the hinge 80 is capable of being pivoted about the wind blocker folding axis 82.

If, as depicted in FIG. 14, the actuating element 224 is actuated, then a pull effect is exerted on the pull element 206 which displaces the second blocking element 182 away from the first blocking element 152, which is in the blocking position, until the projection 158 passing through the parting plane 172 no longer extends into the receptacle 188 so that in this case as well, it is possible to pivot the hinge 80 about the wind blocker folding axis 82.

Figure 15:
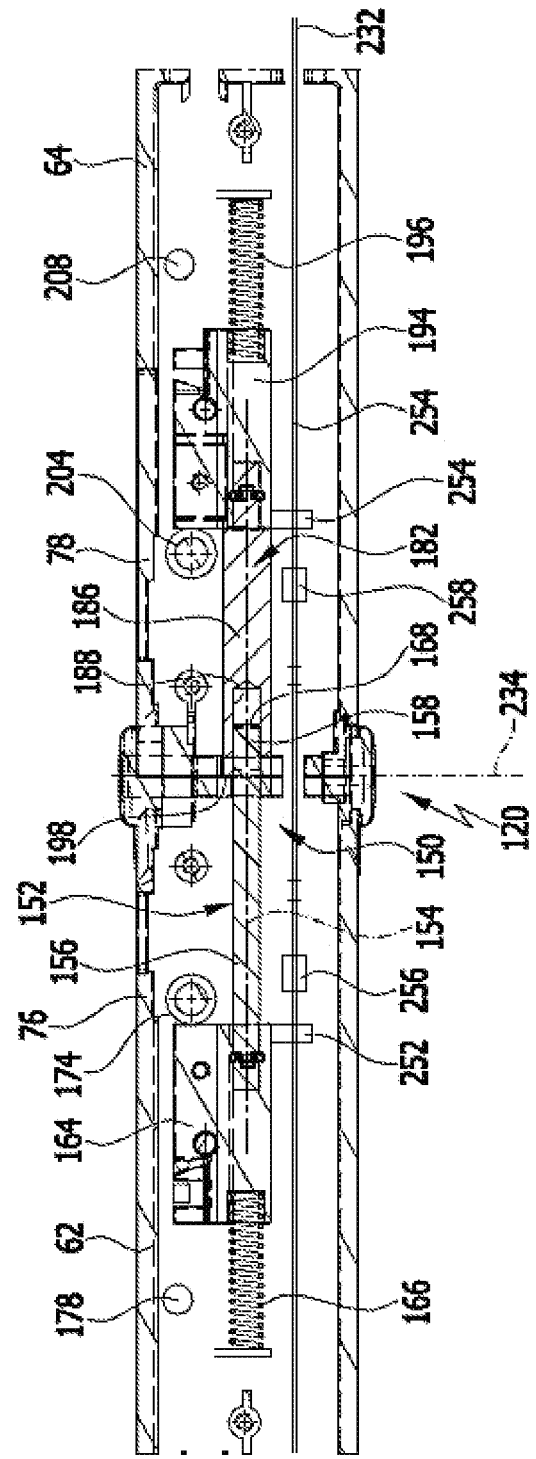
FIG. 15 is a section similar to FIG. 5 taken through a hinge using a second exemplary embodiment of a blocking device.

In a second exemplary embodiment of a blocking device constructed in accordance with the invention, shown in FIG. 15, the same reference numerals are used for elements which are the same as those illustrated in the first exemplary embodiment and reference can be made to the description thereof in its entirety.

As contrasted to the first exemplary embodiment, the pull elements 176 and 206 are replaced by a continuous pull element 232 which extends between two actuating elements 242 and 244 associated with the hinge 120, wherein in this case the hinge 120 is capable of pivoting about the cover folding axis 122, as described in the foregoing.

The pull element 232 runs from the one actuating element 242 to the other actuating element 244, passing through a parting plane 234 that corresponds to the parting plane 172.

Furthermore, as shown in FIG. 15, each of the driver elements 164 and 194 has an arm 252 and 254 respectively which is slidingly movable relative to the pull element 232 and which in particular slidingly guides, for example engages around, the pull element 232.

Furthermore, the pull element 232 in its non-actuated position (FIG. 16), i.e. in a position in which neither the actuating element 242 nor the actuating element 244 is actuated, comprises pull bodies 256 and 258 associated with the arms 252 and 254 respectively and fixed to the pull element 232.

If, as shown in FIG. 17, the actuating element 242 is actuated, for example by turning same and creating a pull effect on the pull element 232, then the pull body 256 co-moves with the pull element 232 and acts on the arm 252 in the sense that the blocking element 152 is moved from the blocking position to the release position as described in connection with the first exemplary embodiment so that subsequent pivoting about the cover folding axis 122 can be realized.

If, as shown in FIG. 18, the actuating element 244 is actuated, then the pull element 232 moves the pull body 258 with it and the pull body 258 acts on the arm 254 and therefore moves the driver element 194 together with the second blocking element 182 from the blocking position to the release position which has also been described in detail in connection with the first exemplary embodiment.

In both cases according to FIG. 17 and FIG. 18, a release position of one of the blocking elements 152 or 182 is achievable in each case, thus enabling pivotal motion about the corresponding axis, for example the cover folding axis 122.

What is claimed is:

1. Wind stop device for motor vehicles, in particular convertible automobiles, comprising a wind blocker having a wind blocker frame extending in a vehicle transverse direction and a flow-hindering element closing a frame opening of the wind blocker frame, wherein the wind blocker is foldable about a wind blocker folding axis between an unfolded position and a folded-together position by way of at least one hinge, a cover pivotally connected to the wind blocker about a pivot axis and having a cover frame extending in the vehicle transverse direction and extending away from the pivot axis and having a flow-hindering element closing a frame opening of the cover frame, wherein the cover frame is foldable about a cover folding axis between an unfolded position and a folded-together position by way of at least one hinge, wherein at least one of the hinges in the unfolded position is blockable against folding into the folded-together position by way of a blocking device.

2. Wind stop device as defined in claim 1, wherein the blocking device is configured such that the blocking of the respective hinge is releasable only by actively actuating an actuating element.

3. Wind stop device as defined in claim 1, wherein the blocking device comprises a first blocking element arranged on one side of the respective pivot axis and a second blocking element arranged on the opposite side of the respective pivot axis and wherein the blocking elements, when in the blocking position thereof, engage in form-locking relationship.

4. Wind stop device as defined in claim 3, wherein at least one of the blocking elements is movable from a blocking position to a release position and wherein the blocking of the respective hinge is already released when one of the blocking elements is in the release position.

5. Wind stop device as defined in claim 3, wherein each of the blocking elements is mounted in a blocking element receptacle for movement between the blocking position and the release position.

6. Wind stop device as defined in claim 3, wherein the blocking elements are displaceable between the blocking position and the release position.

7. Wind stop device as defined in claim 5, wherein each of the blocking elements has the blocking position thereof predetermined by a stop of the blocking element receptacle.

8. Wind stop device as defined in claim 1, wherein each of the blocking elements comprises a form-locking element configured complementarily to the other form-locking element and wherein in the blocking position of the blocking elements, the form-locking elements engage with each other and in particular wherein in the release position of one of the blocking elements, the form-locking elements are out of engagement.

9. Wind stop device as defined in claim 1, wherein at least one of the form-locking elements is configured as a projection which in the blocking position of both form-locking elements engages in the other form-locking element, which is configured as a projection receptacle.

10. Wind stop device as defined in claim 9, wherein the blocking element comprising the projection receptacle is capable of engaging behind the projection in a plane of motion perpendicular to the respective pivot axis, on the side that allows the blocking of a folding action from the unfolded position to the folded-together position.

11. Wind stop device as defined in claim 3, wherein each of the blocking elements is biased in a direction towards the blocking position thereof by way of a spring force reservoir.

12. Wind stop device as defined in claim 3, wherein the blocking element receptacles are held at ends of bars of the wind blocker frame or cover frame that adjoin the respective hinge.

13. Wind stop device as defined in claim 12, wherein the blocking element receptacles are integrated in the ends of the bars that adjoin the hinge.

14. Wind stop device as defined in claim 3, wherein the blocking elements are movable from the blocking position to the release position by way of an actuating element.

15. Wind stop device as defined in claim 14, wherein the actuating elements are arranged at the respective frame.

16. Wind stop device as defined in claim 14, wherein coupling between the respective actuating element and the respective blocking element is provided by a pull element.

17. Wind stop device as defined in claim 16, wherein the pull element extends from the respective blocking element to the actuating element in the respective frame.

18. Wind stop device as defined in claim 3, wherein each of the blocking elements is coupled to the corresponding actuating element via a pull element.

19. Wind stop device as defined in claim 3, wherein a single pull element extends from one actuating element to the other actuating element, transversely to the respective hinge axis, across the respective hinge, and wherein the pull element comprises at least one pull body which, when actuating only one of the actuating elements and moving the pull element, moves one of the blocking elements from the blocking position to the release position.

20. Wind stop device as defined in claim 1, wherein the wind blocker frame and the cover frame are pivotable relative to each other about the pivot axis such that in a flipped-down position of the wind blocker frame, the one of the frames lies in the frame opening of the other one of the frames.

21. Wind stop device as defined in claim 1, wherein, starting from the flipped-down position of the wind blocker frame, the wind blocker frame and the cover frame are foldable in the same folding direction.

22. Wind stop device as defined in claim 1, wherein the wind blocker folding axis and the cover folding axis in the flipped-down position of the wind blocker frame are arranged substantially coincident with each other.

23. Wind stop device as defined in claim 1, wherein the wind blocker folding axis lies in a plane that does not intersect ends of the cross bars of the wind blocker frame that adjoin the wind blocker folding axis.

24. Wind stop device as defined in claim 1, wherein the cover folding axis lies in a plane that does not intersect ends of the cross bars of the cover frame that adjoin the cover folding axis.

25. Wind stop device as defined in claim 1, wherein in the flipped-down position of the wind blocker frame, the flow-hindering element of the wind blocker extends in a surface which is tangent to the wind blocker frame on a side thereof.

26. Wind stop device as defined in claim 1, wherein in the flipped-down position of the wind blocker frame, the wind blocker folding axis extends substantially in the surface in which the flow-hindering element of the wind blocker extends.

27. Wind stop device as defined in claim 1, wherein in a flipped-down position of the wind blocker frame, the flow-hindering element of the cover extends in a surface which is tangent to the cover frame on a side thereof.

28. Wind stop device as defined in claim 1, wherein in the flipped-down position of the wind blocker frame, the cover folding axis extends substantially in a surface in which the flow-hindering element of the cover extends.

29. Wind stop device as defined in claim 1, wherein in the flipped-down position of the wind blocker frame, the flow-hindering element of the wind blocker and the flow-hindering element of the cover are in substantially contacting relationship against each other.

30. Wind stop device as defined in claim 1, wherein the wind blocker frame is configured as one that encloses a frame opening in an approximately U-shaped formation.

31. Wind stop device as defined in claim 20, wherein the wind blocker frame is configured as one that extends all around a frame opening in a closed path.

32. Wind stop device as defined in claim 1, wherein the cover frame is configured as one that encloses a frame opening in an approximately U-shaped formation.

\* \* \* \* \*